(12) United States Patent
Xie et al.

(10) Patent No.: US 11,468,642 B2
(45) Date of Patent: Oct. 11, 2022

(54) USE OF AUGMENTED REALITY FOR SERVICE PROJECTS

(71) Applicant: Intuit Inc., Mountain View, CA (US)

(72) Inventors: Yuhua Xie, Walnut Creek, CA (US); Amanda Burgmeier, Saratoga, CA (US); Jin Salil Barai, Ontario (CA); Athitya Kumar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/922,936

(22) Filed: Jul. 7, 2020

(65) Prior Publication Data

US 2022/0012947 A1 Jan. 13, 2022

(51) Int. Cl.
*G09G 5/00* (2006.01)
*G06T 19/00* (2011.01)

(52) U.S. Cl.
CPC .................. *G06T 19/006* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 2012/0075343 A1* | 3/2012 | Chen | ......................... | G06T 7/73 |
| | | | | 345/633 |
| 2013/0083063 A1* | 4/2013 | Geisner | ................... | G06F 3/013 |
| | | | | 345/633 |
| 2015/0012169 A1* | 1/2015 | Coard | .................. | G06Q 20/202 |
| | | | | 701/29.1 |
| 2015/0091780 A1* | 4/2015 | Lyren | ...................... | G06F 3/012 |
| | | | | 345/8 |
| 2016/0093106 A1* | 3/2016 | Black | ................. | G06K 9/00624 |
| | | | | 345/633 |

OTHER PUBLICATIONS

Mohr et al., Retargeting Technical Documentation to Augmented Reality, Proceedings of the 33rd Annual ACM Conference on Human Factors in Computing Systems, Apr. 2015, pp. 3337-3346 (Year: 2015).*

* cited by examiner

*Primary Examiner* — Charles Tseng
(74) *Attorney, Agent, or Firm* — Paradice and Li LLP

(57) ABSTRACT

Aspects of using augment reality for service projects are described. In some implementations, an augmented reality (AR) system receives one or more images of a real-world space, detects a physical object in the real-world space from the one or more images, and identifies the physical object for a service project. The AR system also generates a virtual object associated with the identified physical object and outputs the virtual object for display in an AR environment. The AR system further receives a selection of one or more portions of the virtual object associated with one or more portions of the physical object to be serviced and generates information for performing the service project based on the one or more portions of the physical object.

20 Claims, 7 Drawing Sheets

USE OF AUGMENTED REALITY FOR SERVICE PROJECTS

TECHNICAL FIELD

This disclosure relates generally to augmented reality systems, and more specifically, to using augmented reality to assist in generating or visualizing information for a service project, such as a cost estimate, invoice, or work to be performed.

BACKGROUND

Service projects that are contracted for and performed by various service technicians (such as plumbers, electricians, handymen, automobile mechanics, and so on) are based on low technology methods of customer interaction. For example, a handyman to repair a washing machine drives from work to a customer site, inspects the washing machine, drives back to work, and generates an estimate. The estimate is then provided remotely to the customer (such as via telephone or email), or the handyman drives back to the customer site to deliver the estimate. Invoicing for a completed service project is also based on low technology methods. For example, the handyman to repair the washing machine generates an invoice at work based on the previously generated estimate before returning to the customer site, or the handy handwrites an invoice after repairing the washing machine. Such estimation and invoicing methods are cumbersome for a service technician and cause customer confusion as to the work required for a service project.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method that can be performed by one or more processors of an augmented reality (AR) system. The method includes receiving one or more images of a real-world space, detecting a physical object in the real-world space from the one or more images, identifying the physical object for a service project, and generating a virtual object associated with the identified physical object. The method also includes outputting the virtual object for display in an AR environment, receiving a selection of one or more portions of the virtual object associated with one or more portions of the physical object to be serviced, and generating information for performing the service project based on the one or more portions of the physical object.

In some implementations, generating information for performing the service project includes generating one or more of a parts list for the service project, an estimate for the service project, an invoice for the service project, or one or more prior service project records for the physical object. The method may also include outputting the information for performing the service project for display. The method may further include outputting the information for performing the service project for transmission to a computer system for managing service project records.

In some implementations, identifying the physical object includes automatically identifying one or more of a type, a make, or a model of the physical object without user input. The method may also include displaying the virtual object concurrently with at least one image of the one or more images in the AR environment. The method may further include displaying the virtual object superimposed on the physical object from a user's view of the real-world space. The method may also include obtaining one or more renderings associated with the identified physical object, and the virtual object is based on the one or more renderings.

Another innovative aspect of the subject matter described in this disclosure can be implemented in an AR system. The AR system includes one or more cameras, one or more displays, one or more processor, and a memory storing instructions. Execution of the instructions by the one or more processors causes the AR system to capture one or more images of a real-world space by the one or more cameras, detect a physical object in the real-world space from the one or more images, identify the physical object for a service project, and generate a virtual object associated with the identified physical object. Execution of the instructions also causes the AR system to display the virtual object in an AR environment on the one or more displays, receive a selection of one or more portions of the virtual object associated with one or more portions of the physical object to be serviced, and generate information for performing the service project based on the one or more portions of the physical object.

In some implementations, generating information for performing the service project includes generating one or more of a parts list for the service project, an estimate for the service project, an invoice for the service project, or one or more prior service records for the physical objects. Execution of the instructions may also cause the AR system to display the information for performing the service project. The AR system may also include a transceiver, and execution of the instructions may further cause the AR system to transmit, by the transceiver, the information for performing the service project to a computer system for managing service project records.

In some implementations, identifying the physical object includes automatically identifying one or more of a type, a make, or a model of the physical object without user input. In some implementations, displaying the virtual object in the AR environment includes displaying the virtual object concurrently with at least one image of the one or more images. In some implementations, displaying the virtual object in the AR environment includes displaying the virtual object superimposed on the physical object from a user's view of the real-world space. Execution of the instructions may also cause the AR system to obtain one or more renderings associated with the identified physical object, and the virtual object is based on the one or more renderings.

Another innovative aspect of the subject matter described in this disclosure can be implemented as a non-transitory computer readable medium. The computer readable medium stores instructions that, when executed by one or more processors of an AR system, cause the AR system to capture one or more images of a real-world space, detect a physical object in the real-world space from the one or more images, identify the physical object for a service project, and generate a virtual object associated with the identified physical object. Execution of the instructions also causes the AR system to display the virtual object in an AR environment, receive a selection of one or more portions of the virtual object associated with one or more portions of the physical object to be serviced, and generate information for performing the service project based on the one or more portions of the physical object.

In some implementations, generating information for performing the service project includes generating one or more of a parts list for the service project, an estimate for the service project, an invoice for the service project, or one or more prior service records for the physical objects. Execution of the instructions may also cause the AR system to display the information for performing the service project. Execution of the instructions may further cause the AR system to transmit the information for performing the service project to a computer system for managing service project records.

In some implementations, identifying the physical object includes automatically identifying one or more of a type, a make, or a model of the physical object without user input. In some implementations, displaying the virtual object in the AR environment includes displaying the virtual object concurrently with at least one image of the one or more images. In some implementations, displaying the virtual object in the AR environment includes displaying the virtual object superimposed on the physical object from a user's view of the real-world space. Execution of the instructions may also cause the AR system to obtain one or more renderings associated with the identified physical object, and the virtual object is based on the one or more renderings.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Implementations of the subject matter disclosed herein are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Figure 1:
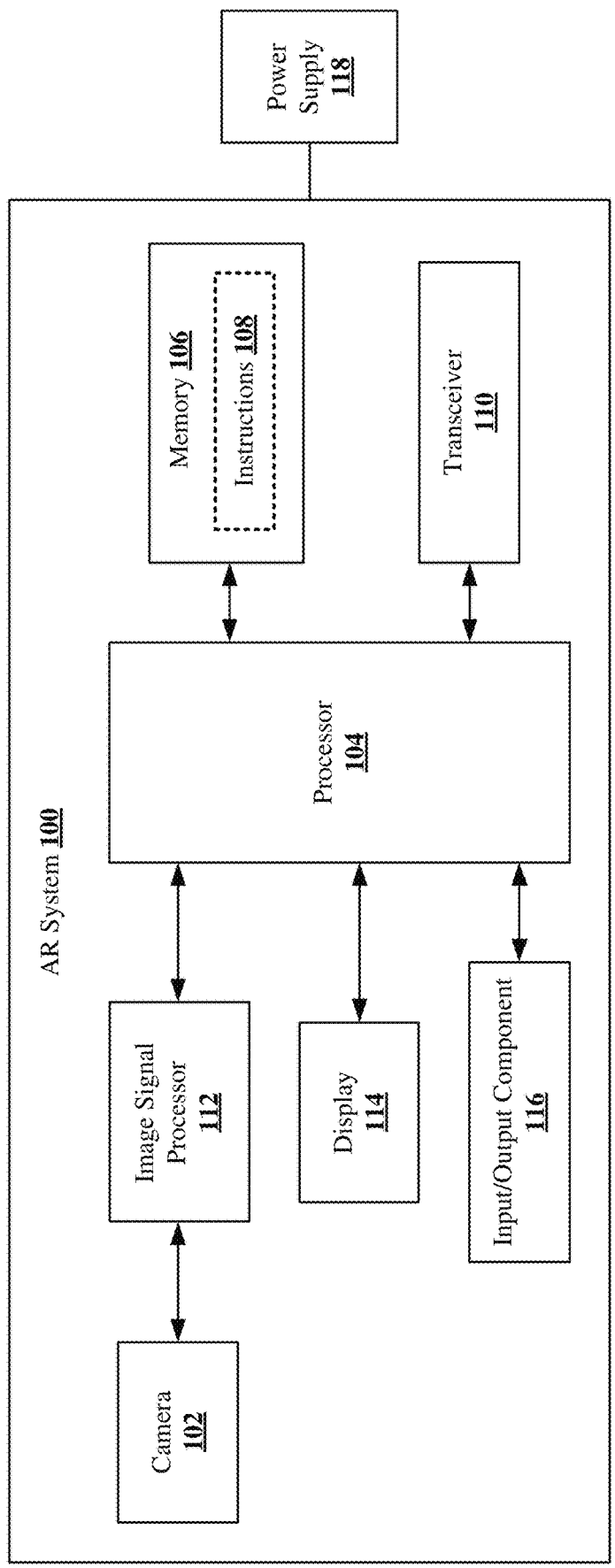
FIG. 1 shows a block diagram of an example augmented reality (AR) system.

Various implementations of the subject matter disclosed herein relate generally to augmented reality (AR) systems, and more specifically, to using AR to assist in generating or visualizing information for a service project. As used herein, a service project refers to an installation, a repair, or a replacement of at least a portion of a physical object by a service technician (which may also be referred to as an object to be serviced). An object to be serviced includes any suitable consumer durable good, e.g., kitchen appliances (such as a sink, faucet, dishwasher, microwave, or refrigerator), household appliances (such as a water softener, hot water tank, ceiling fan, or washing machine), consumer electronics (such as a television, stereo system, or desktop computer), automobiles, and furniture. As used herein, a service technician is a person contracted or to be contracted to service the object (such as an electrician, plumber, handyman, automotive mechanic, computer technician, or carpenter).

When a person wants an object to be serviced (who may also be referred to as a customer), the person contacts a service technician. The customer briefly describes to the service technician the requested service project (such as needing a kitchen faucet repaired). A service technician that diagnoses a problem, provides an estimate, or provides an invoice for the customer uses low technology methods to perform the tasks. For example, in repairing a kitchen faucet, a handyman travels from work to the customer's home and inspects the kitchen faucet to diagnose the problem. Since many different makes and models of kitchen faucets exist, the handyman may be unsure of specific parts needing to be replaced, the availability of such parts, and the difficulty in replacing such parts. Therefore, the handyman travels back to work, looks up the specific make and model of kitchen faucet for specific parts, looks up the availability and price for specific parts, determines the labor needed (such as an amount of time, tools, and specialization) to perform the service project, and generates an estimate for the service project.

The handyman then provides the estimate to the customer via email or phone. If the customer agrees to the estimate, the handyman travels back to the customer's home to perform the service project. The handyman then provides an invoice to the customer after performing the service project. The handyman may generate an invoice based on the estimate before travelling to the customer's home, or the handyman may manually write an invoice (such as in a receipt book).

One problem with generating information for a service project is that the information is manually generated by the service technician multiple times. As used herein, information for a service project refers to one or more of a part list for the physical object (such as parts to be replaced on a kitchen faucet), a labor required for the service project, an estimate to perform the service project (which may include a listing of parts and labor), or an invoice for the service project performed. In the above example of the handyman to repair a kitchen faucet, the handyman records notes in diagnosing the problem with the faucet. After the handyman returns to his work location, he refers to his notes to list parts to be replaced and labor to be involved in generating an estimate for the customer. His notes may indicate specific parts to be replaced, and the handyman manually types the parts into the estimate.

Another problem with generating information for a service project is that the service technician must review multiple sources of information or require more time to diagnose a problem or generate an estimate. In the above example of the handyman to repair a kitchen faucet, the handyman may be unfamiliar with the specific faucet. The handyman may thus need to go back to his work location to find information about the specific kitchen faucet before generating an estimate.

Many service technicians use a set price list for specific service projects to prevent needing to go back to the work location to research the service project. For example, a handyman may provide an estimate to the customer before leaving the customer's home. An example estimate may include a set price of $50 in labor for replacing a kitchen faucet plus the cost of parts to be replaced. However, the estimate does not account for differing levels of difficulty in repairing a kitchen faucet, and a cost in parts is based on the handyman's best guess. The customer may be surprised by the final cost if parts are more expensive than expected, or the service technician may be surprised by the labor involved after beginning to repair the kitchen faucet.

If the handyman generates a more accurate estimate from his work location, the estimate is provided to the customer remotely (such as via email or by phone). The customer may be confused as to the labor or parts required. However, the handyman is not at the customer's home to answer questions regarding the estimate. The customer may feel that the estimate is too much or otherwise feel uncomfortable with the service project if the handyman is unable to explain in person specific issues with the service project (such as if parts are difficult to obtain or labor is more involved for the specific faucet).

Similarly for invoicing, a service technician typically prepares a pre-made invoice based on the estimate or writes by hand a receipt with brief information regarding the cost. The service technician then generates the official invoice (and whether paid) once returning to work from the customer's home. For example, a handyman may have a computer system to manage records for service projects (including estimates, invoices, whether the invoice is paid, and whether the service project was performed). The official invoice in the computer system requires multiple efforts by the handyman (including the handwritten or previously generated invoice provided before leaving the customer's home and the official invoice generated based on the handwritten or previously generated invoice after the handyman returns to his work location).

In some implementations, an AR system is used to assist in generating information for a service project. For example, an AR system may be used to detect a physical object for service and visualize the portions of the physical object for service in an AR environment. The AR system may also indicate the cost of servicing such portions (including labor and parts). Such visualization is used in generating information for the service project (including generating a parts list, generating an estimate, generating an invoice, generating information about one or more prior service records for the physical object) while at the customer site. The visualization may be used by a service technician to explain to the customer specific topics of the service project, including reasons behind an estimate, availability of parts, line items of a generated invoice, and so on. The AR system may also provide a copy of the information to a remote computer system for managing service project records (such as transmitting a generated estimate or invoice via email, via an internet protocol access to the remote computer system, and so on). In this manner, the service technician is not required to duplicate work to generate records for the service project, the service technician can be fully transparent in all work being performed for a service project, the service technician can reduce the amount of back and forth with the customer (such as in explaining customer concerns) before and after performing the service project, and the service technician can perform the service project in a more efficient and expedited manner. As a result, an AR system may be used to increase customer satisfaction with the service technician and the service project performed by the service technician.

Various implementations of the subject matter disclosed herein provide one or more technical solutions to the technical problem of generating records for a service project. More specifically, various aspects of the present disclosure (based on using an AR environment) provide a unique computing solution to a unique computing problem of generating trackable estimates and invoices for services. Implementations of the subject matter disclosed herein are not an abstract idea and/or are not directed to an abstract idea such as organizing human activity or a mental process that can be performed in the human mind. Moreover, various aspects of the present disclosure effect an improvement in the technical field of document generation. These functions cannot be performed in the human mind, much less using pen and paper.

While examples of a handyman (as a service technician) to repair a kitchen faucet or household appliance (as a physical object) are used in describing aspects of the present disclosure, aspects of the disclosure may be used for other types of service technicians (such as electricians, plumbers, automobile mechanics, and so on) or other types of physical objects to be serviced (such as computers, mobile phones, automobiles, and so on). As such, the present disclosure is not limited to a specific example provided below.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions. However, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may include random-access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the implementations disclosed herein may be executed by one or more processors. The term "processor," as used herein may refer to any general-purpose processor, conventional processor, controller, microcontroller, and/or state machine capable of executing scripts or instructions of one or more software programs stored in memory.

Aspects of the present disclosure are applicable to any suitable electronic device or system including or coupled to one or more displays for generating an AR environment. As used herein, an AR environment may refer to a real-world space (or copy of the real-world space, such as in an image) supplemented with virtual information. In this manner, the real-world space is augmented with additional information not seen without assistance from the one or more displays. AR may also be referred to as mixed reality or MR.

The terms "device," "system," and "apparatus" may be used interchangeably herein, and the terms are not limited to one or a specific number of physical objects (such as one smartphone, one AR headset, one processing system, one system on chip (SoC), and so on). As used herein, a device or system may be any electronic device or system with one or more parts that may implement at least some portions of the disclosure. While the below description and examples use the term "system" to describe various aspects of the disclosure, the term "system" is not limited to a specific configuration, type, or number of objects.

FIG. 1 shows a block diagram of an example AR system 100. The example AR system 100 is configured to generate information for a service project (such as an estimate, invoice, parts list, and so on for a physical object to be service). The AR system 100 may be at least a portion of any suitable device for generating an AR environment. Example AR systems include a smartphone, a tablet, an AR headset, a laptop or desktop computer, or other suitable devices including or coupled to one or more displays. The AR system 100 includes or is coupled to a camera 102, an image signal processor 112, a display 114, an input/output (I/O) component 116, a processor 104, a memory 106 storing instructions 108, and a transceiver 110. The AR system 100 may also include or be coupled to a power supply 118. The AR system 100 may include additional features or components not shown. For example, the AR system 100 may include a baseband processor for the transceiver 110, a graphics processor for the display 114, one or more motion sensors (such as a gyroscope), a flash, and so on.

The camera 102 includes one or more cameras. Each camera is configured to capture one or more images (such as a still image or a stream of images for video). Multiple cameras may be used for three dimensional imaging (such as stereoscopic imaging) or other suitable imaging for generating an AR environment based on the real-world space captured in the one or more images. In the example of a smartphone or tablet, the AR system 100 includes one or more rear facing cameras (on a side opposite of a display 114) configured to capture the one or more images.

The memory 106 may be a non-transient or non-transitory computer readable medium storing computer-executable instructions 108 to perform all or a portion of one or more operations described in this disclosure. In some implementations, the instructions 108 include an operating system executed by the AR system 100 (such as an operating system for a smartphone, tablet, or computer). The instructions 108 may also include one or more applications for generating an AR environment or for generating information for a service project. The instructions 108 may also include other applications or programs executed by the AR system 100.

The processor 104 includes one or more suitable processors capable of executing scripts or instructions of one or more software programs (such as instructions 108 stored in memory 106). For example, the processor 104 may include one or more application processors to execute the one or more applications for generating the AR environment or for generating information for a service project. In addition or alternative to executing scripts or instructions, the processor 104 may include integrated circuits or other hardware to perform functions or operations without the use of software.

The display 114 includes one or more displays for generating an AR environment for a user of the AR system 100. In some implementations, the AR system 100 includes a smartphone or tablet including a display 114 to display an image or a stream of images (such as a video) captured by the camera 102. The display 114 is also configured to display a virtual object concurrently with the one or more images captured by the camera 102. Concurrent display of a virtual object with one or more images is described in more detail with reference to FIGS. 2 and 3. In some other implementations, the AR system 100 includes an AR headset including one or more transparent displays to superimpose virtual objects onto objects in a user's view of a real-world space. In some further implementations, the AR system 100 includes a heads up display (HUD) to superimpose virtual objects onto objects in a user's view of a real-world space. The display 114 may also be configured to display menus, control panels (such as for a graphical user interface (GUI)) for generating information for a service project, or the generated information for the service project (such as a parts list, estimate, invoice, or one or more prior service project records).

In some implementations, a graphics processor (not shown) or the processor 104 blends a virtual object with one or more images of a real-world space to generate an AR environment to be displayed. The virtual object may be located and oriented in the one or more images in any suitable manner (such as being positioned in an image based on a position of the corresponding physical object in the image). In some other implementations, a graphics processor (not shown) or the processor 104 generates one or more images including the virtual object to be displayed on one or more transparent displays (such as a HUD or AR headset). The positioning of the virtual object in the one or more generated images is based on the positioning of the physical object in the one or more captured images from the camera 102.

The I/O components 116 include any suitable mechanism, interface, or device to receive input (such as commands) from the user and to provide output to the user. For example, the display 114 may include a touch-sensitive display, and the I/O components includes a GUI and touch input mechanism for the display 114. Other example I/O components include a keyboard, mouse, microphone and speakers, a squeezable bezel, one or more buttons (such as a power button), a slider or switch, joystick, controller, virtual reality (VR) glove, and so on. While the examples below describe the display 114 as a two dimensional, touch sensitive display (such as for a smartphone or tablet) and the I/O components 116 as a GUI for the touch sensitive display, any suitable display and I/O components may be used to perform aspects of the present disclosure.

The image signal processor 112 includes one or more image signal processors to process captured images provided by the camera 102. The image signal processor 112 may also be configured to analyze the one or more images, including detecting a physical object in a real-world space captured in the one or more images or identifying the physical object (such as based on object recognition). In addition or to the alternative, the processor 104 is configured to analyze the one or more images, such as described herein.

The image signal processor 112 may execute instructions from a memory (such as instructions 108 from the memory 106, instructions stored in a separate memory coupled to the image signal processor 112, or instructions provided by the processor 104). In addition or alternative to the image signal processor 112 including one or more general purpose processors configured to execute software, the image signal processor 112 may include specific hardware to perform one or more operations described in the present disclosure. The image signal processor 112 alternatively or additionally may include a combination of specific hardware and the ability to execute software instructions.

The transceiver 110 includes one or more communication interfaces for the AR system 100 to communicate with another computing system. For a wireless communication interface, the transceiver 110 includes one or more antennas and front end logic to wireless communicate with another device (such as via cellular, BLUETOOTH, near-field communications (NFC), or Wi-Fi communications). For a wired communication interface, the transceiver 110 includes one or more ports for connecting the AR system 100 to a backhaul to communicate with the other device (such as an ethernet port, a firewire port, or a universal serial bus (USB) port). The AR system 100 may be configured to communicate via the transceiver 110 to the remote computing system using any suitable communication protocol (such as an internet protocol, email, instant messaging, or a proprietary communication protocol). In this manner, the AR system 100 is configured to communicate information for performing a service project to a computing system for managing service project records for the service technician. For example, the AR system 100 may transmit an estimate or an invoice to the computing system, with the computing system including the received estimate or invoice in the records for the specific service project.

While shown to be coupled to each other via the processor 104 in the example of FIG. 1, the processor 104, the memory 106, the image signal processor 112, the display 114, the I/O components 116, and the transceiver 110 may be coupled to one another in various arrangements. For example, the processor 104, the memory 106, the image signal processor 112, the display 114, the I/O components 116, and/or the transceiver 110 may be coupled to each other via one or more local buses (not shown for simplicity). While the following examples for generating AR environment and for generating information for a service project are described with reference to the example AR system 100 in FIG. 1, any suitable device, apparatus, system, or configuration of components including or coupled to one or more displays may be used. In addition, while the AR system 100 is described in general as performing functions in the below example, the functions may be performed by any suitable component of the AR system 100 (such as the processor 104, the image signal processor 112, and so on).

As noted above, diagnosing a service project to be performed, and generating an estimate, invoice, or other information for the service project, may be difficult if based entirely on the service technician's expertise. Even if the service technician understands the service project, explaining the service project to the customer in a satisfactory manner may also be difficult. An AR environment allows a service technician to better diagnose the service project and generate information for the service project. An AR environment may also be used to be explain the service project to the customer.

An AR environment includes a virtual object associated with a physical object to be serviced. In some implementations, the virtual object includes a mapping of parts with reference to one another in assembling the physical object. Many manufacturers, service manuals, or service technicians previously servicing the physical object provide one or more renderings of the physical object. For example, a kitchen faucet manufacturer includes a rendering of an assembly diagram of parts for each model of kitchen faucet. If the AR environment's virtual object is based on the assembly diagram of parts, a service technician may understand the complexity of the physical object based on the virtual object. The service technician may also understand which parts are to be replaced (or repaired) and the difficulty in replacing such parts based on the virtual object. A customer may also better understand the extent of the service project based on seeing the virtual object. With such information readily available at the AR system 100, the AR system 100 may also be used to generate parts lists, explanations of required labor, explanations of prior service projects for the object, estimates, invoices, or other information for the service project without requiring the service technician to travel back to the work location. Such information may be transmitted by the AR system 100 to a computing system to manage service project records.

For a service project, a service technician surveys a real-world space (e.g., a customer's kitchen) in diagnosing a problem (e.g., repairing a kitchen faucet). The AR system 100 may be used during diagnosis to assist the service technician. The AR system 100 may also be used to generate an estimate, invoice, or other suitable information for the service project. While the examples illustrate the AR system 100 as a handheld device (such as a smartphone or tablet), the AR system 100 may be any suitable device or components as described above.

Figure 2:
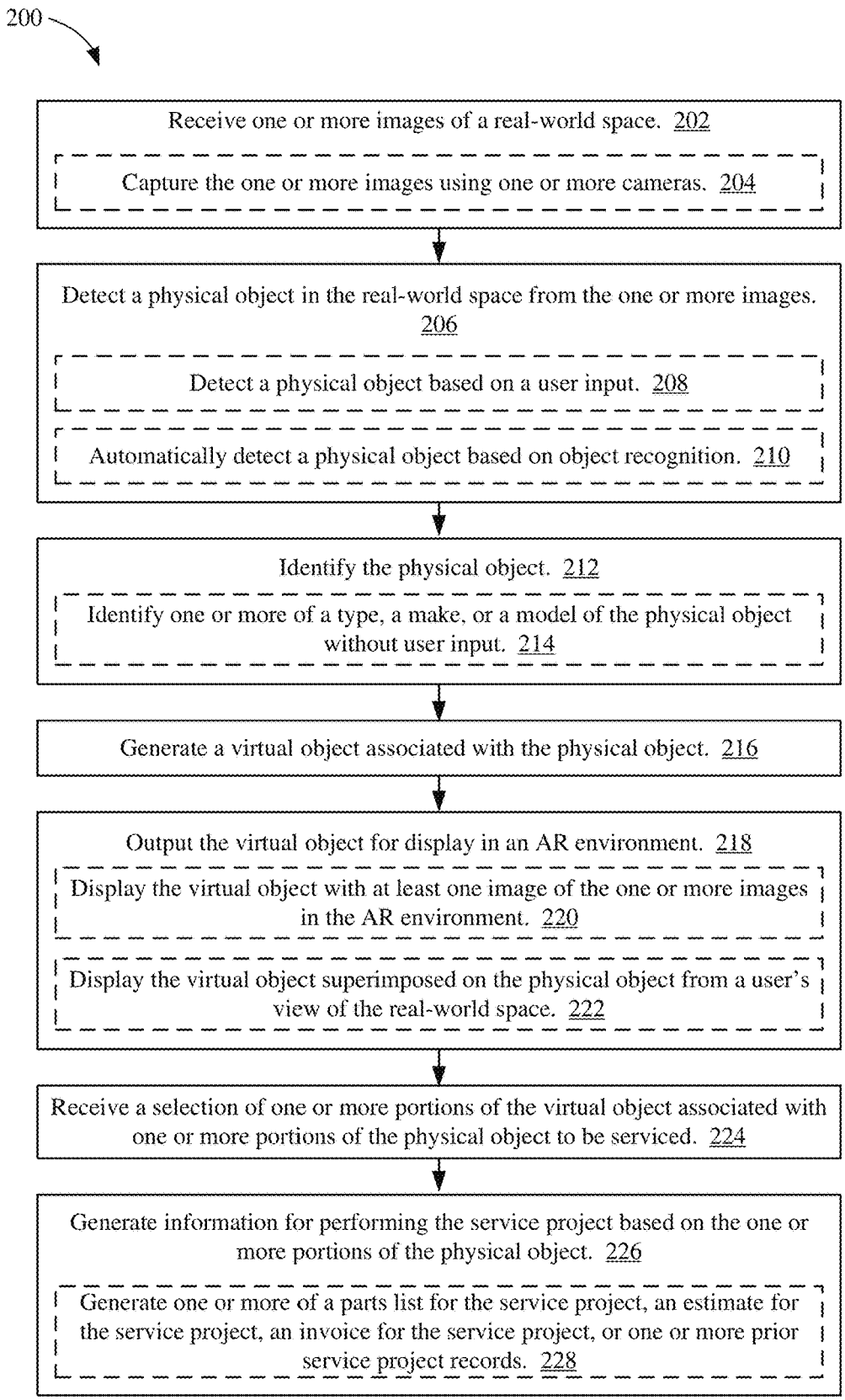
FIG. 2 shows an illustrative flowchart depicting an example operation for using an AR environment to assist with a service project.

FIG. 2 shows an illustrative flowchart depicting an example operation 200 for using an AR environment to assist with a service project. At 202, the AR system 100 (such as the processor 104 or the image signal processor 112) receives one or more images of a real-world space. For example, if the service project is to repair a kitchen faucet, the real-world space is at least a portion of the customer's kitchen including the kitchen faucet. In some implementations, the camera 102 (which may be one or more cameras) captures one or more images of the real-world space including the physical object (204). Continuing the above example, a service technician may point his handheld device's camera toward the kitchen faucet, and the camera captures one or more images of the kitchen including the kitchen faucet.

At 206, the AR system 100 detects a physical object in the real-world space from the one or more images. The AR system 100 uses any suitable object detection means to detect the physical object. Detection of the physical object includes determining that a physical object exists in the real-world space for which a service project may be associated. For example, if an image of a blank wall, the sky, or another real-world space without physical objects is captured, the AR system 100 may not detect a physical object in the image.

In some implementations, detection of the physical object may be based on a user input (208). For example, the service technician may touch the location of the physical object in a preview of the one or more images displayed on the display 114. In some other implementations, the AR system 100 may automatically detect a physical object based on object recognition (210). Object recognition may be based on differences in depths, reflectivity, or other visual characteristics to indicate that a physical object separate from a background exists in the real-world space.

At 212, the AR system 100 identifies the physical object. Identifying the physical object may include identifying one or more of the type, make, or model of the physical object without user input (214). An example of automatically identifying the type includes identifying whether the physical object is a kitchen faucet versus a dishwasher versus a refrigerator. An example of automatically identifying the make includes identifying whether the physical object is manufactured by manufacturer A versus manufacturer B. An example of automatically identifying the model includes identifying whether the specific object is a specific model A or a specific model B manufactured by the identified manufacturer.

In some example implementations of identifying a specific kitchen faucet, the AR system 100 may use basic visual characteristics of a kitchen faucet to differentiate it from a refrigerator or other kitchen appliance. Example visual characteristics for a kitchen faucet may include its size compared to other physical objects that may be serviced, inclusion of a spout, inclusion of a handle, proximity to a kitchen basin, existence of water or wet surfaces, or existence of a manufacturer logo. Example visual characteristics for a refrigerator may include its size, dimensions (such as a vertical box structure), number and location of doors, lights, or existence of a manufacturer logo. The visual characteristics for one or more types of physical objects may be stored in a memory (such as memory 106 or a memory remote to the AR system 100). The AR system 100 is configured to access the stored visual characteristics and compare the stored visual characteristics to the representation of the physical object in the one or more images to identify the type of physical object. The representation of the physical object in the one or more images may be determined in any suitable manner, such as based on depths of the object from the AR system 100, edges or an outline of the object in the one or more images, reflectivity of a surface of the physical object, and so on. Comparing stored visual characteristics to the representation may include generating visual characteristics based on the representation, and comparing the generated characteristics to the stored characteristics.

Visual characteristics may also exist for different makes of kitchen faucets. For example, a kitchen faucet manufacturer may use a unique handle size or design, spout design, or body design. One or more visual characteristics associated with a manufacturer may also be stored for a plurality of manufacturers. After identifying the type of physical object, the visual characteristics for the different makes of the physical object type may be compared to the representation of the physical object in the one or more images to identify the make of the physical object. Similarly, visual characteristics associated with the different models of the identified make may be compared to the representation of the physical object in the one or more images to identify the model of the physical object. In this manner, identifying a specific model of a physical object (such as a specific model of kitchen faucet) may be a drill down design for which a type and then a make are first identified before identifying the model.

As noted above, the stored visual characteristics may be stored locally or remotely. If stored remotely (such as on a work computer system or third party server), the AR system 100 communicates with the remote system using the transceiver 110. For example, the service technician's smartphone may communicate over a wireless backhaul with a work computer system that stores a database of the visual characteristics. The same work computer system may also be used to manage service project records (including estimates and invoices). In this manner, as products are updated (including new makes and models released to the public), the AR system 100 may be updated to identify the new products by updating the remote computer system with new visual characteristics for each new make and model. In this manner, multiple AR systems may be used within a company without requiring frequent updates for each and every release of new products. Additionally, the computer system may be capable of storing and organizing a larger database (including more physical objects) than may be capable on the AR system 100 (such as on a smartphone).

The AR system 100 may be unable to differentiate between different types, different makes, or different models of a physical object in some instances. For example, the AR system 100 may be unable to identify whether a physical object is model A or model B based on similarity of the models, lighting in the real-world space, or other limitations. Being unable to identify a physical object may include determining that a best match of visual characteristics is still below a confidence threshold (for which the differences in the stored visual characteristics and generated visual characteristics of the representation differ by more than a threshold). In some implementations, the AR system 100 requests user input to identify the physical object. In some examples, the AR system 100 lists candidate makes or models that a service technician may select. Images of the different makes or models or identifying features for the physical object may be provided to assist in the selection process. In some other examples, the AR system 100 asks questions specific to candidate makes or models to attempt to identify the physical object. The AR system 100 may also guide the service technician to reorient the camera 102 (such as a close-up on the faucet spout) in order to better identify the physical object based on one or more visual characteristics.

After identifying the physical object, the AR system 100 generates a virtual object associated with the physical object (216). In some implementations, generating the virtual object includes obtaining a stored virtual object from a local or remote memory. For example, the memory 106 may store a plurality of virtual objects for different physical objects. In another example, a computing system storing virtual objects that resides at a work location may be accessed remotely by the AR system 100 to obtain a specific virtual object. As noted above, one or more renderings may exist for the specific physical object. For example, an assembly diagram of parts or other technical drawings for the specific model of the physical object may exist. In some implementations, the virtual object is based on the one or more renderings. For example, the virtual object may be an assembly diagram. In this manner, assembly diagrams from manufacturers or manuals may be uploaded to the AR system 100 or the remote computer system to update the virtual objects stored. In another example, the virtual object may be a three-dimensional model of the physical object based on the one or more renderings (such as a three dimensional model of the assembly diagram for a kitchen faucet).

At 218, the AR system 100 (such as the processor 104) outputs the virtual object for display in an AR environment. Displaying the virtual object in an AR environment includes displaying the virtual object with the real-world space or with a representation of the real-world space (such as with one or more images of the real-world space). In some implementations, the AR system 100 displays (on the display 114) the virtual object with at least one image of the one or more images in the AR environment (220). For example, the stream of images captured by the camera 102 may be displayed on the display 114. The virtual object may be added as a layer to the one or more images or combined with the one or more images (such as flattening the layers) so that the virtual object and an image are concurrently displayed. For example, a smartphone display may display the one or more images captured by the smartphone's camera, and an assembly diagram or three dimensional model of an assembly diagram may be displayed on top of the one or more images. Portions of the virtual object may be at least partially transparent to allow seeing both the virtual object and an image in the same space.

In some other implementations, the display 114 may display the virtual object superimposed on the physical objects from a user's view of the real-world space (222). For example, the AR system 100 may include an AR headset or HUD. The display 114 may thus include one or more transparent lenses able to display objects in a user's field of view while still allowing the user to view the real-world space. In this manner, the display 114 may display a hologram or other image of the assembly diagram or three dimensional model that may appear to the user to be superimposed on the physical object.

In some implementations of displaying the virtual object, the positioning of the virtual object may be based on the positioning of the physical object in the one or more images. For example, the virtual object may be shrunk or expanded to mimic the size of the physical object in the one or more images, the virtual object may be rotated to mimic the orientation of the physical object in the one or more images, or the virtual object may be moved to mimic the location of the physical object in the one or more images.

Figure 3:
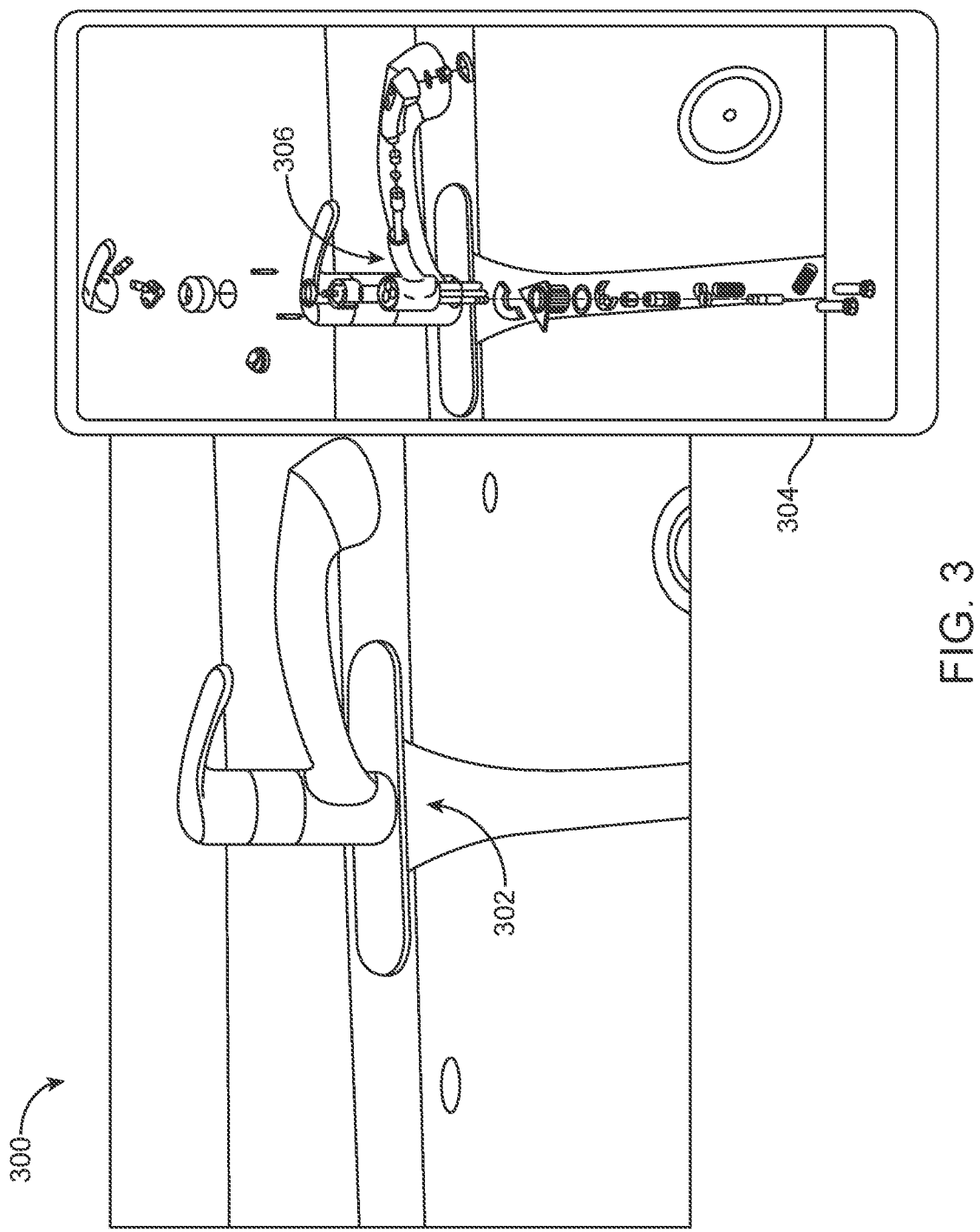
FIG. 3 shows a depiction of an example AR environment for a service project.

FIG. 3 shows a depiction 300 of an example AR environment for a service project. In the example depiction 300, the service project is repairing a kitchen faucet. The real-world space includes the physical object 302. The handheld device 304 is used to capture images of the physical object 302 and display the images concurrently with a virtual object 306 associated with the physical object 302. As illustrated, the virtual object may be an assembly diagram for the kitchen faucet, and the positioning of the virtual object may be based on the positioning of the physical object 302 in the images.

While the virtual object 306 shows all of the parts for the kitchen faucet in the example depiction 300, in some other implementations, the virtual object may show only a portion of the parts of the physical object (such as parts not visible to the naked eye without disassembly or changing perspectives). For example, the virtual object may depict the portions of the kitchen faucet under the counter (such as the piping and fasteners for the kitchen faucet under the counter). The virtual object may also depict internal portions of the kitchen faucet (such as springs and hoses inside the housing).

Figure 4:
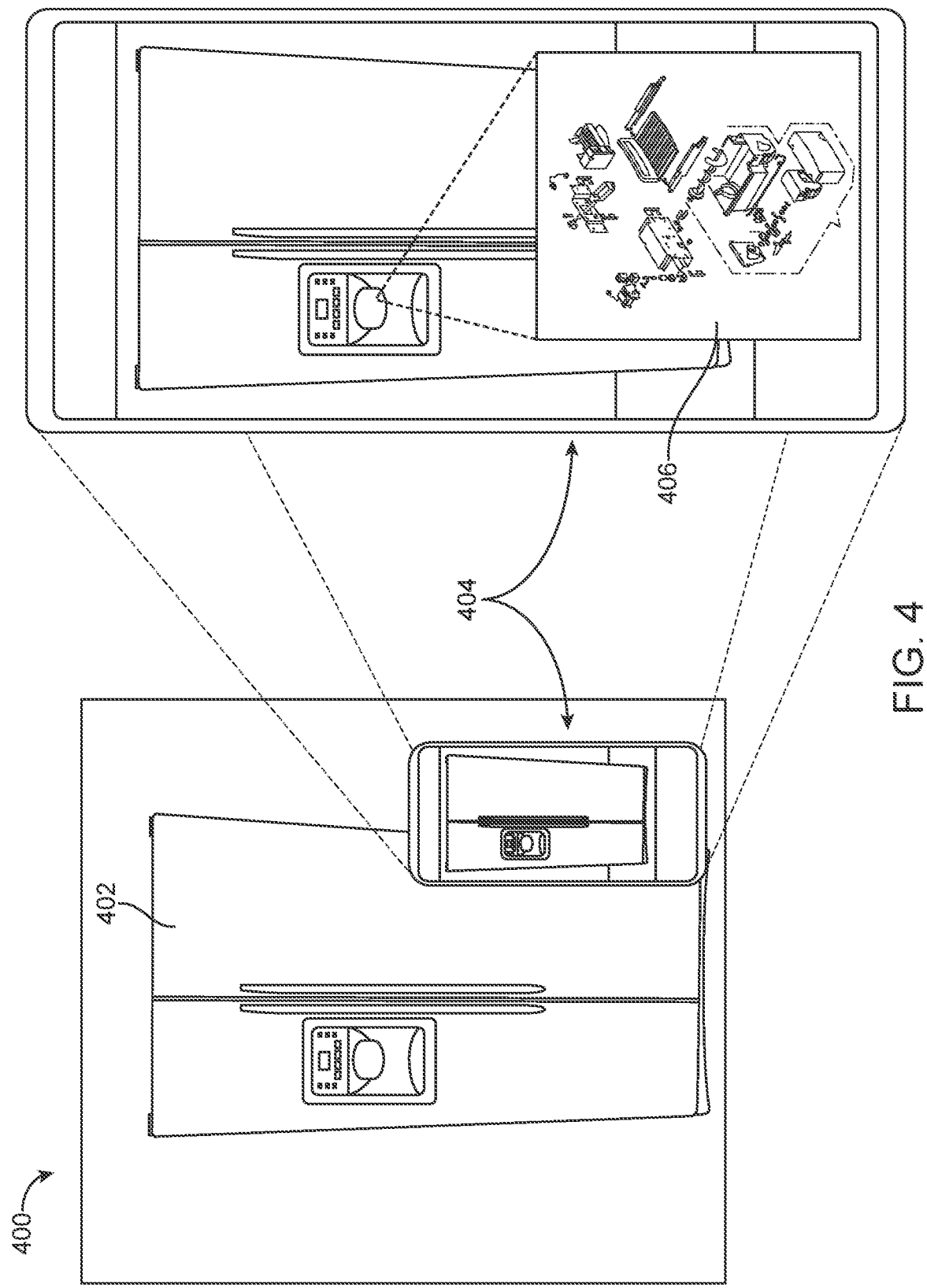
FIG. 4 shows a depiction of another example AR environment for a service project.

In other examples of displaying the virtual object, the virtual object may be displayed in a window over or near the physical object or side-by-side with one or more images including the physical object. FIG. 4 shows a depiction 400 of another example AR environment for a service project. In the example depiction 400, the service project is repairing an ice dispenser of a refrigerator. The real-world space includes the physical object 402. The handheld device 404 is used to capture images of the physical object 402 and display the images concurrently with a virtual object 406 associated with the physical object 402. As illustrated, the virtual object 406 may be an assembly diagram displayed as a window over the one or more images.

The virtual object may correspond to a specific portion of the physical object. In some implementations, displaying the virtual object may also be used to indicate a location on the physical object for the service project. For example, referring to FIG. 4, the virtual object may be positioned or may include an indication as to a location of the ice dispenser on the refrigerator for repair.

A physical object may be associated with multiple virtual objects. For example, a refrigerator includes many subsystems, such as the ice dispenser, freezer compartment assembly, refrigerator compartment assembly, control subsystem, door assembly, and so on. Each subsystem may correspond to a different virtual object (such as an assembly diagram for each subsystem). In some implementations, the AR system 100 queries the user to select the subsystem for the service project (which may also be referred to as selecting the appropriate virtual object for the service project), and the AR system 100 displays the appropriate virtual object in response.

Figure 5:
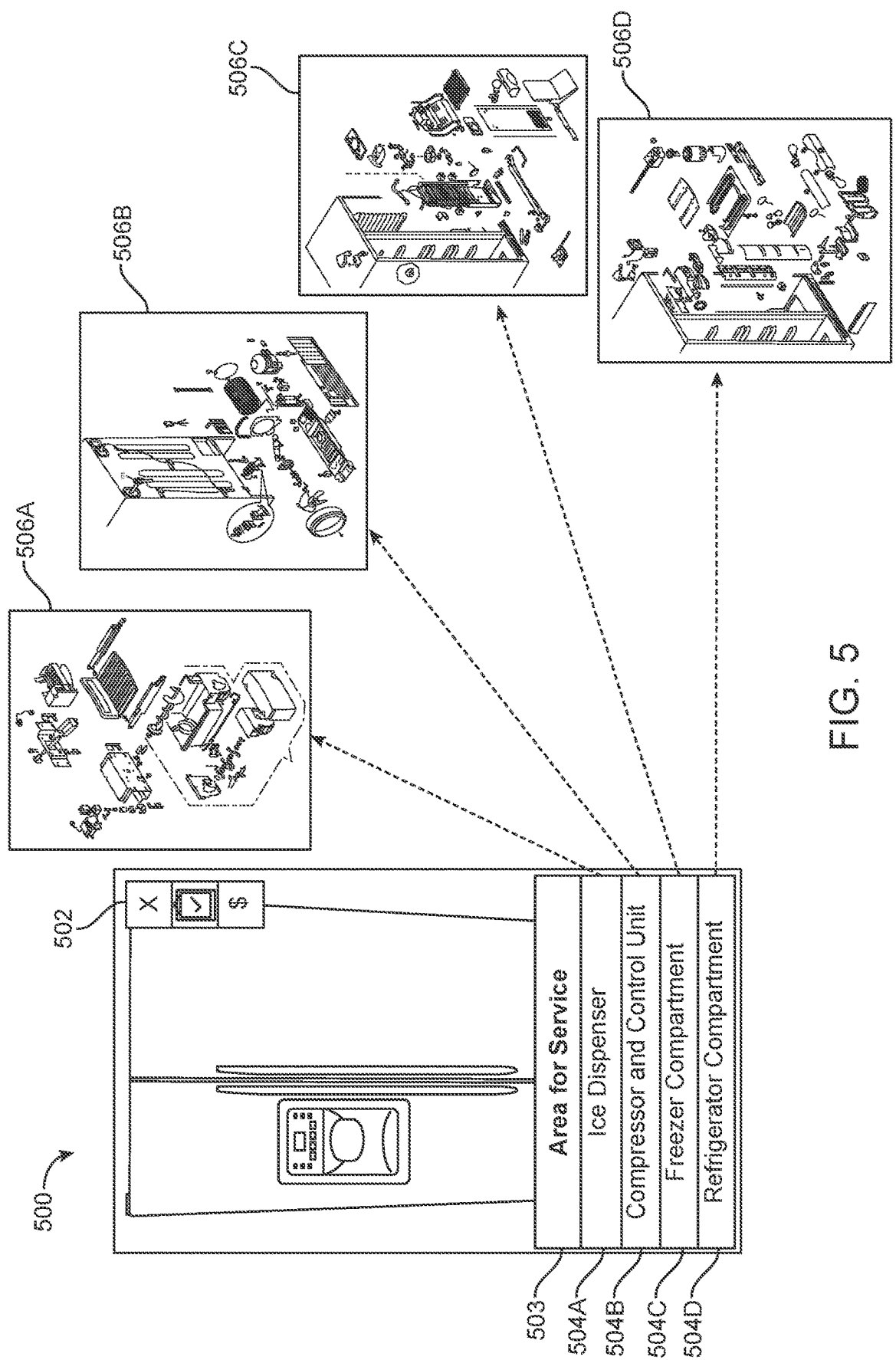
FIG. 5 shows an example display for selecting a virtual object for a service project.

FIG. 5 shows an example display 500 for selecting a virtual object for a service project. The display includes an "Area for Service" menu 503 to allow the service technician to select the appropriate area of the refrigerator for service. For example, selecting the Ice Dispenser 504A causes the virtual object 506A to be displayed, selecting the Compressor and Control Unit 504B causes the virtual object 506B to be displayed, selecting the Freezer Compartment 504C causes the virtual object 506C to be displayed, and selecting the Refrigerator Compartment 504D causes the virtual object 506D to be displayed. Displaying the virtual object may be similar to as described above (such as with reference to FIGS. 3 and 4).

Referring back to FIG. 5, the display 500 may also include a control menu 502. The control menu 502 may be used to control operation of the AR system 100 for the service project. For example, a service technician's smartphone may include an application for service projects. If the service technician wishes to exit the application, return to a home screen, or otherwise perform an escape or exit function, the service technician presses the X button in the control menu 502. As shown, the button including a clipboard with a checkmark is selected. This button may be selected to place the application in an identification mode. In such mode, identifying the specific physical object and displaying the virtual object may be performed. The button may also be used for a diagnostic mode for when a service technician diagnoses a problem associated with the physical object (such as which parts are to be replaced), which is described in more detail with reference to FIG. 6A. The button including the dollar sign may be used for generating a parts list, an estimate, an invoice, or other information for the service project by the AR system 100, which is described in more detail with reference to FIG. 6B.

Referring back to FIG. 2, with the virtual object displayed in the AR environment, the AR system 100 receives a selection of one or more portions of the virtual object associated with one or more portions of the physical object to be serviced (224). In some implementations, the service technician may touch one or more portions of the virtual object to indicate portions of the physical object for repair. For example, the service technician may select one or more parts in an assembly diagram to indicate parts of the physical object to be replaced.

If the display 114 includes a touch sensitive display (such as for a handheld device), the service technician may touch the portions of the displayed virtual object. If the display 114 includes a HUD or is for an AR headset, the service technician may use a controller or other input means to select the appropriate portions. Other input means may include a mouse or keyboard to select the appropriate portions. In some implementations, the entire virtual object may be selected to indicate the entire physical object (such as if the entire physical object is to be replaced).

Figure 6A:
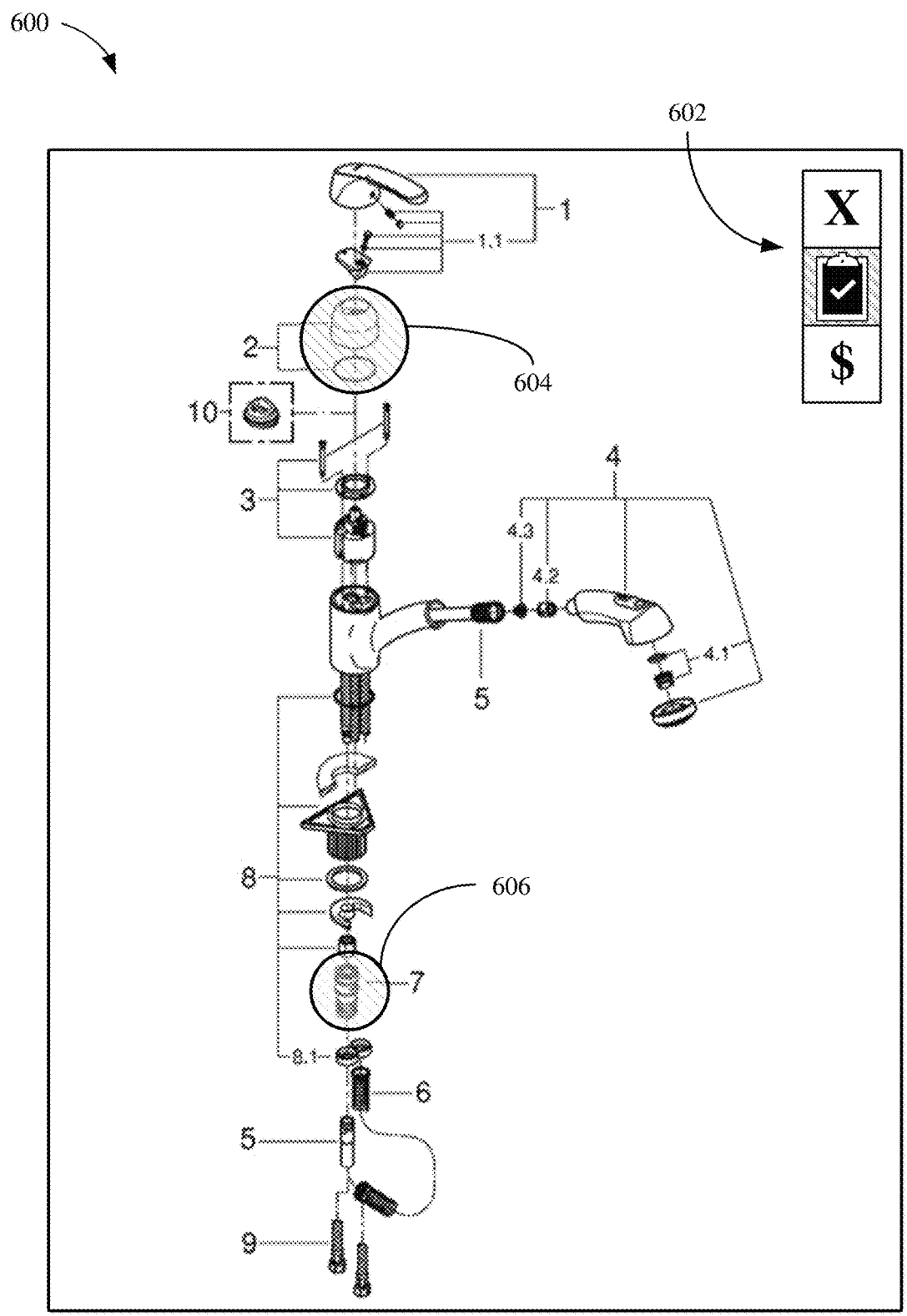
FIG. 6A shows an example display displaying a virtual object for selecting one or more portions for a service project.

FIG. 6A shows an example display 600 displaying a virtual object for selecting one or more portions for a service project. The one or more images or a representation of the physical object is not shown in FIG. 6A (and FIG. 6B) for clarity in explaining aspects of the disclosure. In practice, the display may include displaying the one or more images with the virtual object. For example, the display 600 for a kitchen faucet (as depicted in FIG. 6A) may be similar to the display in FIG. 3. The service technician, in diagnosing a problem with the kitchen faucet, may determine that a cartridge cap (part 2) and a hose guide/stop (part 7) need to be replaced. The service technician thus touches part 2 (indicated by highlight 604) and part 7 (indicated by highlight 606). If the entire faucet is to be replaced, the service technician may select the entire virtual object or otherwise indicate that the faucet is to be removed and replaced. As shown, the display displays the control menu 602 (which is the same as control menu 502 in FIG. 5). The identification and diagnostic mode may thus be used in indicating which portions of the physical object are to be serviced.

Referring back to FIG. 2, with the one or more portions of the virtual object selected, the AR system 100 generates information for performing the service project based on the one or more portions of the physical object (226). In some implementations, the AR system 100 may generate one or more of a parts list, an estimate for the service project, an invoice for the service project, or one or more prior service project records (228). A parts list may be based on the parts selected (such as part 2 and part 7 of the kitchen faucet in the above example), and the parts list may include if or when the part is available, the part price, different options for the part, or a part number (such as from the manufacturer). The parts list may include additional or different information, such as one or more links to ordering parts, an indication where the part is located (such as at the technician's place of work, a warehouse, or at the part supplier's warehouse), information as to whether the part was previously serviced for the customer, information as to whether similar parts were previously serviced for the make or model of the physical object across all customers, and so on.

An estimate may include a list of parts and cost of the parts (such as the parts list or a simple naming of the parts and cost with less information than a parts list) and the labor estimate. An invoice may include the list of parts and cost of the parts and the actual or agreed to cost of labor. An example generation of an estimate or an invoice is described with reference to FIG. 6B. A parts list is also described with reference to FIG. 6B.

In some implementations, the AR system 100 generates information regarding one or more prior service records for the physical object. If the physical object is previously diagnosed (to generate an estimate or parts list) or serviced (to generate an invoice) by the service technician (or an associated service technician), a computer system at the service technician's work location may manage the records for the prior service (such as the generated estimate, the generated invoice, or any other notes on the previous service project). The AR system 100 may obtain the one or more prior service project records from the computer system (such as via a wireless backhaul) for viewing by the service technician or the customer. In some implementations, the computer system associates the records with one or more of a record number (such as an invoice number or an estimate number), customer information (such as the customer's name, customer's email address, customer's postal address, or a unique customer number), a specific physical object previously serviced (such as a type, make, and model), a date the record was generated, or a date service was performed.

Based on customer information and the identified physical object, the AR system 100 may access relevant prior service project records for display on display 114. Prior service project records may then be reviewed to determine, for example, if the parts or service are covered under a warranty, if similar service projects are being repeated for the same physical object, or the durability or life span of the physical object. For example, a customer may question why a kitchen faucet requires another service project. However, the current service project may be for different parts or different portions of the kitchen faucet than prior service projects. With the prior service projects generated on the AR system 100, the service technician is able to explain the differences to the customer as to why the kitchen faucet requires further servicing. The service technician may also be able to determine from prior service project records (and explain to the customer) if replacement of the entire kitchen faucet (such as with a similar model) is more economically feasible than repeatedly repairing the existing kitchen faucet. In some implementations, if no prior service projects exist for the customer or the physical object, the AR system 100 may indicate to the service technician that no prior service projects exist. For example, the AR system 100 may access the remote computer system to query whether prior service project records for the physical object are stored. The computer system indicates to the AR system 100 no prior service project records are found, and the AR system 100 may indicate such to the service technician. In some other implementations, the AR system 100 may not generate information regarding prior service project records if none exist.

Figure 6B:
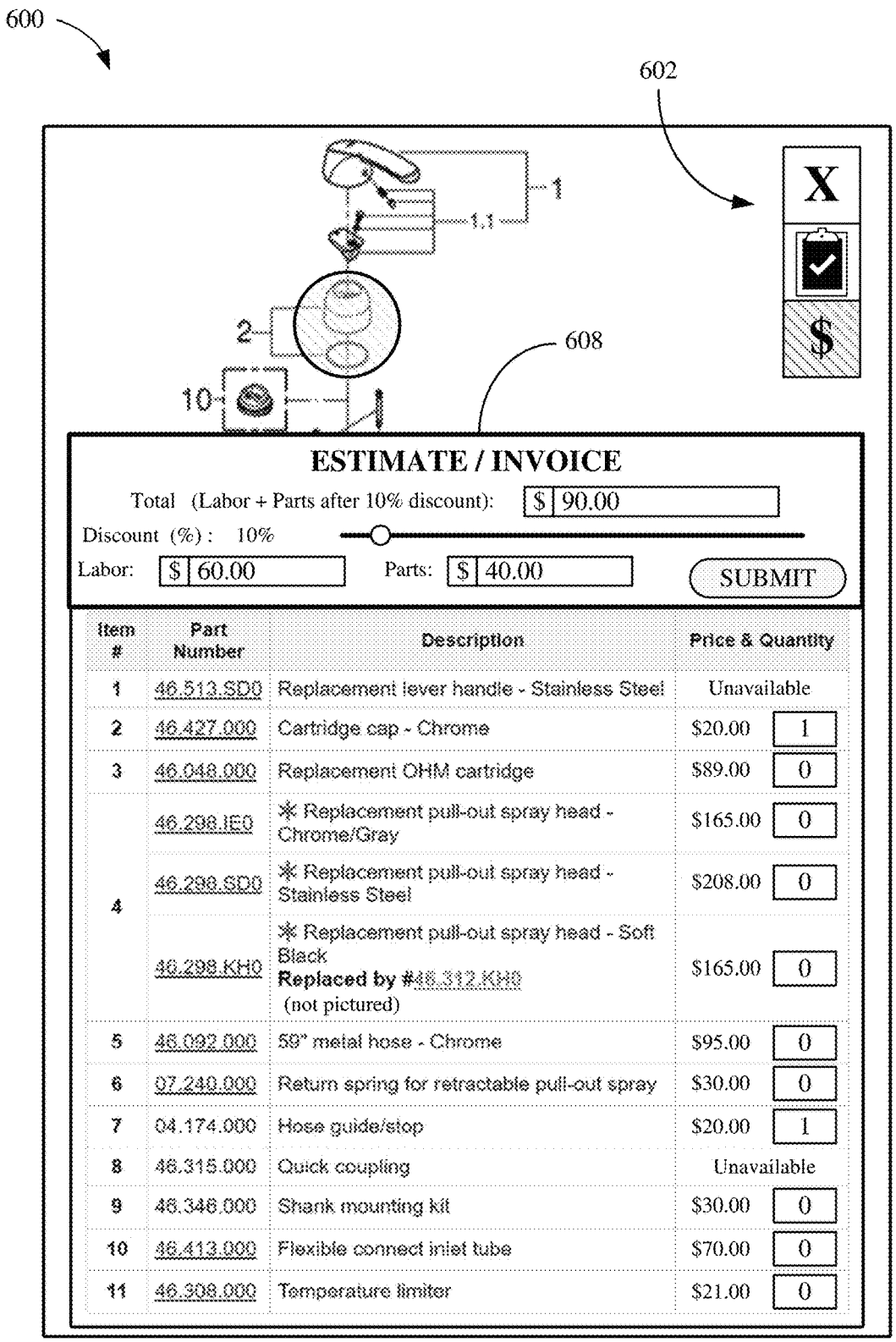
FIG. 6B shows the example display in FIG. 6A displaying an example estimate or invoice menu for generating information for a service project.

FIG. 6B shows the example display 600 in FIG. 6A displaying an example estimate or invoice menu 608 for generating information for a service project. The AR system 100 may first generate an estimate for a service project using the menu 608. If an estimate is already generated for a service project, then the AR system 100 may generate an invoice for the service project using the menu 608. In some other implementations, the control menu 602 may include an additional button to allow differentiating between generating an estimate and generating an invoice. In this manner, multiple estimates may be generated before generating an invoice. The control menu 602 may also include one or more additional buttons to allow differentiating between generating one or more prior service project records, generating a parts list, or generating an estimate or an invoice. In some other implementations, the parts list may be included in generating the estimate or the invoice, or the one or more prior service project records may be automatically generated based on the portions of the physical object or the physical object itself being identified for the customer.

The menu 608 includes a total based on parts and labor. In some implementations, the total may also be based on a discount to be provided by the service technician to the customer. Control of a discount is displayed as a slider to adjust a percentage discount from a total price. In some implementations for labor cost, the cost is manually input by the service technician. For an invoice, the labor cost may be based on actual time spent or an agreed upon flat fee. For an estimate, the labor cost may be based on the service technician's estimate of time and difficulty required for the service project. With the service technician able to review the virtual object (or prior service project records), the service technician is able to determine the complexity of the problem to provide a more accurate labor cost estimate. In some implementations, the AR system 100 may include or access a database of labor costs for similar service projects. The database may associate similar service projects based on specific models of the physical object, the parts of the physical object identified, the particular service technician performing the service project, the date of the previous service projects, a set price list for the customer or service, prior service projects for the customer or physical object, or other suitable criteria. In this manner, the AR system 100 may automatically provide an initial estimate of labor costs for the service technician's review. The service technician may adjust the estimate as appropriate (such as by entering a different value into the labor box).

The parts cost may be based on the parts identified by the service technician. For example, with the service technician selecting part 2 and part 7 (FIG. 6A), the parts cost is based on the cost of part 2 plus part 7. In some implementations, the menu 608 includes a parts list that may be reviewed by the service technician or the customer. The parts list may indicate the mapping of parts listed in the menu 608 to the virtual object (indicated by "Item #"). The parts list may also indicate the part number as defined by the manufacturer (indicated by "Part Number"). In some implementations, a specific part number may include a link (such as a uniform resource link (URL) or internal link) to information regarding the part. If the link is selected, a manufacturer webpage, technical specification for the part, or other suitable information may be displayed. In this manner, the service technician may determine if special care or handling is required for the part. The link may also be used to link to a comparison of prices from multiple vendors. In this manner, the customer may be apprised of the market price for a specific part to ensure the customer is comfortable with the quoted price. In some implementations, a physical object may include different options for a part. For example, for part 4 (a "pull-out spray head"), three different finish options exist for the part. The menu may thus be used to allow the customer to select different options as he or she wishes (instead of automatically replacing the original part with the same part). Such listing of options may also be used to list original equipment manufacturer (OEM) parts compared to compatible after-market or third party parts. As shown, the parts list may also indicate if parts are updated to different parts, or if there are any other changes to the parts for the physical object. The price and quantity indicates if the part is available, the price of the part (either to the service technician or to the customer, which may include wholesale or retail prices), and the quantity of the part to be ordered for the service project.

The parts list is not limited to the information illustrated or the format of the information illustrated in FIG. 6B, as the parts list may take any suitable form for indicating parts to be serviced. In some implementations, the parts list includes a column with a selectable element for the service technician to order the part. In some other implementations, the price in the illustrated parts list is selectable to allow the service technician to order the part while still at the customer's home. The parts list may also indicate estimated time to receive the part, current location of the part being ordered, number of parts available for order, whether the part is discontinued, on backorder, or otherwise currently unavailable, reviews of the part being ordered (such as warnings as to whether the part frequently fails), or other information regarding the parts. For example, the service technician may select "Unavailable" for part 1, and the AR system 100 may display when or whether the part is to be available in the near future, information for ordering the part from third parties, or reasons for the part not being available (such as being discontinued).

To prevent accidental ordering of parts, the AR system 100 may generate a confirmation that is selectable by the service technician to confirm ordering the one or more parts. In this manner, multiple inputs from the service technician may be required for order the parts via the AR system 100.

Before or after generating the estimate, the service technician may discuss the different parts of the estimate (from the parts list) with the customer. With the AR system 100 displaying the AR environment, the customer is able to visualize the problem (such as the parts to be serviced) and better understand the work involved for the service project. As a result, the customer is able to ask more directed questions and otherwise feel more comfortable with the estimate, invoice, and service technician for the service project. In generating an estimate, the service technician may select the submit button in the menu 608. After pressing the submit button, the AR system 100 (or a remote computer system managing service project records) may generate an estimate number (or other identifier) for the estimate. For example, the estimate is generated and submitted to the remote computer system managing service project records. The computer system may assign to the estimate an estimate number or record number for the service project, and the computer system may store the service project record associated with the record number for future access and management. In this manner, the estimate may be searched for in the computer system by the estimate number or the record number. The AR system 100 may receive the number from the remote computer system and display the number for the service technician. The service technician may also search for the estimate using the AR system 100 based on the estimate number or record number. In generating an invoice, the menu 608 may include an area to enter an estimate number or record number to preset the different portions of the menu (including the labor box, parts box, discount, and total). The service technician may adjust the values and press submit to generate an invoice (which may be associated with an invoice number, similar to an estimate number described above). For example, the computer system may assign to the invoice an invoice number or record number for the service project, and the computer system may store the invoice associated with the record number for future access and management. In some implementations, a copy of the invoice may be provided to the customer soon after generating the invoice (such as by email from the remote computer system managing service project records or the AR system 100 used by the service technician). In this manner, the service technician is not required to return to an office to manually enter details regarding the service project to generate a parts list, estimate, invoice, or other information for the service project. In some implementations, records may also be searched based on customer, site address, date, or other suitable information. In this manner, the service technician may determine previous service projects for the customer while at the customer's home.

While the examples describe a service technician providing user inputs to the AR system 100, in some other implementations, a customer or other type of user may provide inputs to the AR system 100. As such, the present disclosure is not limited to a specific type of user. Additionally, while some menus for performing aspects of the disclosure are illustrated with reference to touch inputs on a touch sensitive display, any suitable menus and input means may be used. For example, a menu may be audible based or a user may provide audible inputs, haptic inputs, or visual inputs to the AR system to generate information for the service project. As such, the examples in the present disclosure may be simplified for clarity in explaining some aspects, and the present disclosure is not limited to a specific example.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method performed by one or more processors of an augmented reality (AR) system, the method comprising:
    displaying, on a touch sensitive display of the AR system, a control menu, wherein the control menu includes one or more buttons to allow a user to switch the AR system between:
        an identification and diagnostic mode to identify which portions of a physical object are to be serviced; and
        an estimate mode to generate an estimate;

while in the identification and diagnostic mode:
receiving one or more images of a real-world space;
detecting the physical object in the real-world space from the one or more images;
identifying the physical object for a service project;
generating a virtual object associated with the physical object, wherein the virtual object includes one or more parts that are associated with one or more parts of the physical object that are not visible in the real-world space;
displaying the virtual object in an AR environment on the touch sensitive display, wherein the virtual object includes a plurality of parts selectable by the user, the plurality of parts including the one or more parts of the virtual object associated with the one or more parts of the physical object that are not visible in the real-world space;
receiving, at the touch sensitive display, a user selection of one or more parts of the virtual object associated with one or more parts of the physical object to be serviced; and
highlighting, on the touch sensitive display, the one or more parts of the virtual object associated with the one or more parts of the physical object to be serviced as selected by the user;
receiving, at the touch sensitive display, an input to the control menu to switch the AR system from the identification and diagnostic mode to the estimate mode; and
while in the estimate mode:
generating a parts list for the service project based on the one or more parts of the physical object to be serviced;
generating a total estimate for the service project based on the parts list, wherein generating the total estimate includes obtaining a cost for each part of the one or more parts of the physical object to be serviced and obtaining a labor estimate; and
displaying, on the touch sensitive display, the total estimate for the service project.

2. The method of claim 1, wherein generating the total estimate for the service project is based on:
one or more prior service project records for the physical object.

3. The method of claim 1, further comprising outputting the total estimate for the service project for transmission to a computer system for managing service project records.

4. The method of claim 3, further comprising:
receiving, at the touch sensitive display, another input to the control menu to switch the AR system from one of the identification and diagnostic mode or the estimate mode to an invoice mode to generate an invoice for the service project, wherein the invoice mode is associated with a button of the one or more buttons of the control menu; and
while in the invoice mode:
generating the invoice for the service project based on the total estimate for the service project;
displaying, on the touch sensitive display, the invoice for the service project; and
outputting the invoice for the service project for transmission to the computer system for managing the service project records.

5. The method of claim 1, wherein identifying the physical object includes automatically identifying one or more of a type, a make, or a model of the physical object without user input.

6. The method of claim 1, further comprising displaying the virtual object concurrently with at least one image of the one or more images in the AR environment.

7. The method of claim 1, further comprising displaying the virtual object superimposed on the physical object from a view of the user of the real-world space.

8. The method of claim 1, further comprising obtaining one or more assembly diagrams associated with the physical object, wherein:
the virtual object is based on the one or more assembly diagrams; and
the one or more assembly diagrams include the one or more parts of the virtual object associated with the one or more parts of the physical object that are not visible in the real-world space.

9. An augmented reality (AR) system comprising:
one or more cameras;
one or more displays, wherein the one or more displays includes a touch sensitive display;
one or more processors; and
a memory storing instructions that, when executed by the one or more processors, cause the AR system to:
display, on the touch sensitive display, a control menu, wherein the control menu includes one or more buttons to allow a user to switch the AR system between:
an identification and diagnostic mode to identify which portions of a physical object are to be serviced; and
an estimate mode to generate an estimate;
while in the identification and diagnostic mode:
capture one or more images of a real-world space by the one or more cameras;
detect the physical object in the real-world space from the one or more images;
identify the physical object for a service project;
generate a virtual object associated with the physical object, wherein the virtual object includes one or more parts that are associated with one or more parts of the physical object that are not visible in the real-world space;
display the virtual object in an AR environment on the touch sensitive display, wherein the virtual object includes a plurality of parts selectable by the user, the plurality of parts including the one or more parts of the virtual object associated with the one or more parts of the physical object that are not visible in the real-world space;
receive, at the touch sensitive display, a user selection of one or more parts of the virtual object associated with one or more parts of the physical object to be serviced; and
highlight, on the touch sensitive display, the one or more parts of the virtual object associated with the one or more parts of the physical object to be serviced as selected by the user;
receive, at the touch sensitive display, an input to the control menu to switch the AR system from the identification and diagnostic mode to the estimate mode; and
while in the estimate mode:
generate a parts list for the service project based on the one or more parts of the physical object to be serviced;
generate a total estimate for the service project based on the parts list, wherein generating the total estimate includes obtaining a cost for each part of the one or more parts of the physical object to be serviced and obtaining a labor estimate; and display, on the touch sensitive display, the total estimate for the service project.

10. The AR system of claim 9, wherein generating the total estimate for the service project is based on:
one or more prior service project records for the physical object.

11. The AR system of claim 9, further comprising a transceiver, wherein execution of the instructions further causes the AR system to transmit, by the transceiver, the total estimate for the service project to a computer system for managing service project records.

12. The AR system of claim 11, wherein execution of the instructions further causes the AR system to:
receive, at the touch sensitive display, another input to the control menu to switch the AR system from one of the identification and diagnostic mode or the estimate mode to an invoice mode to generate an invoice for the service project, wherein the invoice mode is associated with a button of the one or more buttons of the control menu; and while in the invoice mode:
generate the invoice for the service project based on the total estimate for the service project;
display, on the touch sensitive display, the invoice for the service project; and
transmit, by the transceiver, the invoice for the service project to the computer system for managing the service project records.

13. The AR system of claim 9, wherein identifying the physical object includes automatically identifying one or more of a type, a make, or a model of the physical object without user input.

14. The AR system of claim 9, wherein displaying the virtual object in the AR environment includes displaying the virtual object concurrently with at least one image of the one or more images.

15. The AR system of claim 9, wherein displaying the virtual object in the AR environment includes displaying the virtual object superimposed on the physical object from a view of the user of the real-world space.

16. The AR system of claim 9, wherein execution of the instructions further causes the AR system to obtain one or more assembly diagrams associated with the physical object, wherein:
the virtual object is based on the one or more assembly diagrams; and
the one or more assembly diagrams include the one or more parts of the virtual object associated with the one or more parts of the physical object that are not visible in the real-world space.

17. A non-transitory computer readable medium storing instructions that, when executed by one or more processors of an augmented reality (AR) system, cause the AR system to:
display, on a touch sensitive display of the AR system, a control menu, wherein the control menu includes one or more buttons to allow a user to switch the AR system between:
an identification and diagnostic mode to identify which portions of a physical object are to be serviced; and
an estimate mode to generate an estimate;

while in the identification and diagnostic mode:
capture one or more images of a real-world space;
detect the physical object in the real-world space from the one or more images;
identify the physical object for a service project;
generate a virtual object associated with the physical object, wherein the virtual object includes one or more parts that are associated with one or more parts of the physical object that are not visible in the real-world space;
display the virtual object in an AR environment on the touch sensitive display, wherein the virtual object includes a plurality of parts selectable by the user, the plurality of parts including the one or more parts of the virtual object associated with the one or more parts of the physical object that are not visible in the real-world space;
receive, at the touch sensitive display, a user selection of one or more parts of the virtual object associated with one or more parts of the physical object to be serviced; and
highlight, on the touch sensitive display, the one or more parts of the virtual object associated with the one or more parts of the physical object to be serviced as selected by the user;

receive, at the touch sensitive display, an input to the control menu to switch the AR system from the identification and diagnostic mode to the estimate mode; and while in the estimate mode:
generate a parts list for the service project based on the one or more parts of the physical object to be serviced;
generate a total estimate for the service project based on the parts list, wherein generating the total estimate includes obtaining a cost for each part of the one or more parts of the physical object to be serviced and obtaining a labor estimate; and
display, on the touch sensitive display, the total estimate for the service project.

18. The non-transitory computer readable medium of claim 17, wherein generating the total estimate for the service project is based on:
one or more prior service project records for the physical object.

19. The non-transitory computer readable medium of claim 17, wherein identifying the physical object includes automatically identifying one or more of a type, a make, or a model of the physical object without user input.

20. The non-transitory computer readable medium of claim 17, wherein execution of the instructions further causes the AR system to obtain one or more assembly diagrams associated with the physical object, wherein:
the virtual object is based on the one or more assembly diagrams; and
the one or more assembly diagrams include the one or more parts of the virtual object associated with the one or more parts of the physical object that are not visible in the real-world space.

* * * * *